United States Patent
Greatbatch et al.

(10) Patent No.: US 11,610,485 B2
(45) Date of Patent: Mar. 21, 2023

(54) TRAFFIC SIGNAL CHANGE VISUALIZATION SYSTEMS AND METHODS

(71) Applicant: GM GLOBAL TECHNOLOGY OPERATIONS LLC, Detroit, MI (US)

(72) Inventors: Richard L. Greatbatch, Blacksburg, VA (US); Omer Tsimhoni, Bloomfield Hills, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 17/158,128

(22) Filed: Jan. 26, 2021

(65) Prior Publication Data

US 2022/0238017 A1 Jul. 28, 2022

(51) Int. Cl.
*G08G 1/07* (2006.01)
*G08G 1/096* (2006.01)
*G06F 3/01* (2006.01)
*G08G 1/095* (2006.01)
*B60K 37/02* (2006.01)
*G06V 20/59* (2022.01)

(52) U.S. Cl.
CPC .............. *G08G 1/096* (2013.01); *B60K 37/02* (2013.01); *G06F 3/013* (2013.01); *G06V 20/597* (2022.01); *G08G 1/095* (2013.01); *B60K 2370/1529* (2019.05)

(58) Field of Classification Search
None
See application file for complete search history.

(56) References Cited

U.S. PATENT DOCUMENTS

| | | | |
|---|---|---|---|
| 9,035,797 B2 * | 5/2015 | Varma | G08G 1/0104 340/905 |
| 2015/0070195 A1 * | 3/2015 | Gaines | G08G 1/096783 340/932 |
| 2016/0035223 A1 * | 2/2016 | Gutmann | G08G 1/09626 340/907 |

* cited by examiner

*Primary Examiner* — Brent Swarthout

(57) ABSTRACT

A head up display system of a vehicle includes: a communication module configured to receive a period until a traffic signal of an intersection of roads will change from a first state to a second state; a distance module configured to, based on the period and a present speed of the vehicle, determine a distance in front of the vehicle where the vehicle will be when the traffic signal transitions from the first state to the second state; a light source configured to, via a windshield of the vehicle, generate a virtual display that is visible within a passenger cabin of the vehicle; and a display control module configured to, based on the distance, control the light source to include, in the virtual display, a visual indicator of a location in a path of the vehicle where the traffic signal will transition from the first state to the second state.

20 Claims, 13 Drawing Sheets

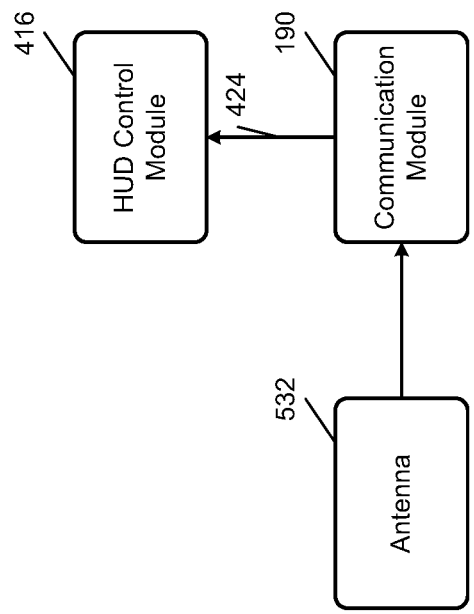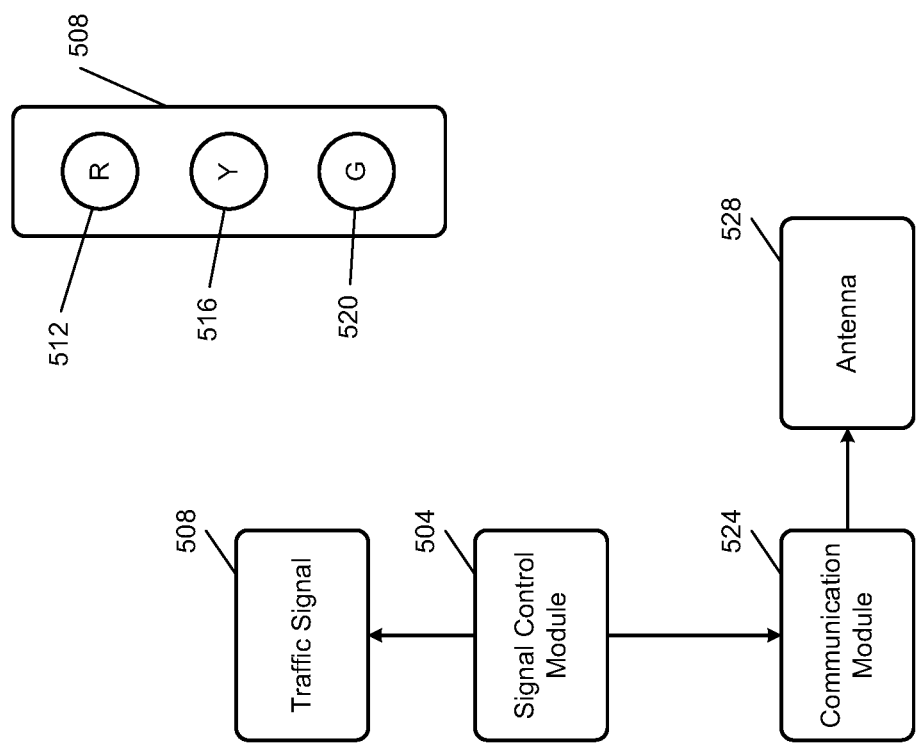
FIG. 5

TRAFFIC SIGNAL CHANGE VISUALIZATION SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to head up display systems of vehicles and more particularly to displaying visual indicators of locations where traffic signal changes will occur via head up display systems of vehicles.

A driver of a vehicle traditionally views surroundings of a vehicle through windows, wind shields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information on a windshield of the vehicle. For example, the HUD may display a vehicle speed and other vehicle information.

SUMMARY

In a feature, a head up display (HUD) system of a vehicle includes: a communication module configured to receive a period until a traffic signal of an intersection of roads will change from a first state to a second state; a distance module configured to, based on the period and a present speed of the vehicle, determine a distance in front of the vehicle where the vehicle will be when the traffic signal transitions from the first state to the second state; a light source configured to, via a windshield of the vehicle, generate a virtual display that is visible within a passenger cabin of the vehicle; and a display control module configured to, based on the distance, control the light source to include, in the virtual display, a visual indicator of a location in a path of the vehicle where the traffic signal will transition from the first state to the second state.

In further features, the display control module is configured to control the light source such that the visual indicator includes a color corresponding to the second state.

In further features, the color is one of red, yellow, and green.

In further features: the communication module is further configured to receive a second period until the traffic signal of the intersection of roads will change from the second state to a third state; the distance module is further configured to, based on the second period and the present speed of the vehicle, determine a second distance in front of the vehicle where the vehicle will be traffic signal transitions from the second state to the third state; and the display control module is further configured to, based on the second distance, control the light source to include, in the virtual display, a second visual indicator of a second location in the path of the vehicle where the traffic signal will transition from the second state to the third state.

In further features, the display control module is configured to control the light source such that the visual indicator includes a first color corresponding to the second state and the second visual indicator includes a second color corresponding to the third state.

In further features, the visual indicator extends horizontally at the location toward boundaries of a present lane of the vehicle.

In further features, the visual indicator extends horizontally and vertically at the location.

In further features, the visual indicator extends depthwise toward the intersection.

In further features, the visual indicator extends vertically and depthwise.

In further features, the communication module is configured to receive the period wirelessly from a signal control module configured to control the traffic signal.

In further features, the communication module is configured to receive the period, via the Internet, from a signal control module configured to control the traffic signal.

In further features a disabling module is configured to selectively disable the display of the visual indicator when a gaze of a driver is not toward a road in front of the vehicle.

In further features: an eye location module is configured to determine a location of eyes of a driver of the vehicle, and the display control module is configured to adjust a location of the visual indicator in the virtual display based on the location of the eyes of the driver.

In further features, the first state includes the traffic signal illuminating a green indicator and the second state includes the traffic signal illuminating a yellow indicator.

In further features, the first state includes the traffic signal illuminating a yellow indicator and the second state includes the traffic signal illuminating a red indicator.

In further features, the first state includes the traffic signal illuminating a red indicator and the second state includes the traffic signal illuminating a green indicator.

In a feature, a head up display (HUD) method for a vehicle includes: receiving a period until a traffic signal of an intersection of roads will change from a first state to a second state; based on the period and a present speed of the vehicle, determining a distance in front of the vehicle where the vehicle will be when the traffic signal transitions from the first state to the second state; via a windshield of the vehicle, generating a virtual display that is visible within a passenger cabin of the vehicle; and based on the distance, controlling the light source to include, in the virtual display, a visual indicator of a location in a path of the vehicle where the traffic signal will transition from the first state to the second state.

In further features, the controlling includes controlling the light source such that the visual indicator includes a color corresponding to the second state.

In further features, the color is one of red, yellow, and green.

In further features, the HUD method further includes: receiving a second period until the traffic signal of the intersection of roads will change from the second state to a third state; based on the second period and the present speed of the vehicle, determining a second distance in front of the vehicle where the vehicle will be traffic signal transitions from the second state to the third state; and based on the second distance, controlling the light source to include, in the virtual display, a second visual indicator of a second location in the path of the vehicle where the traffic signal will transition from the second state to the third state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a functional block diagram of an example traffic light control and communication system;

In the drawings, reference numbers may be reused to identify similar and/or identical elements.

DETAILED DESCRIPTION

A vehicle may include a head up display (HUD) that displays a virtual image via a windshield of the vehicle. A light source may project the virtual image onto a reflector, and the reflector may reflect the virtual image onto the windshield. Alternatively, the light source may project the virtual image directly onto the windshield. In various implementations, the HUD system may include two or more light sources, such as to project light on two or more different vertical planes.

Traffic signals are used at some intersections to regulate traffic flow through the intersection. When a vehicle is approaching an intersection, the traffic signal may be in one state (e.g., green). The traffic signal may change, however, as the vehicle gets closer to the intersection (e.g., from green to yellow, from yellow to red, or from red to green).

The present application involves, the HUD system projecting one or more visual indicators of where the vehicle will be on the road when the state of a traffic signal of the intersection changes one or more times. For example, if the traffic signal is currently green, the HUD system may display an indicator of where the vehicle will be on the road when the traffic signal will change to yellow. The visual indicator(s) may help a driver make proper braking, acceleration, and speed adjustments. This may increase vehicle efficiency, reduce vehicle wear, and reduce traffic congestion.

Figure 1:
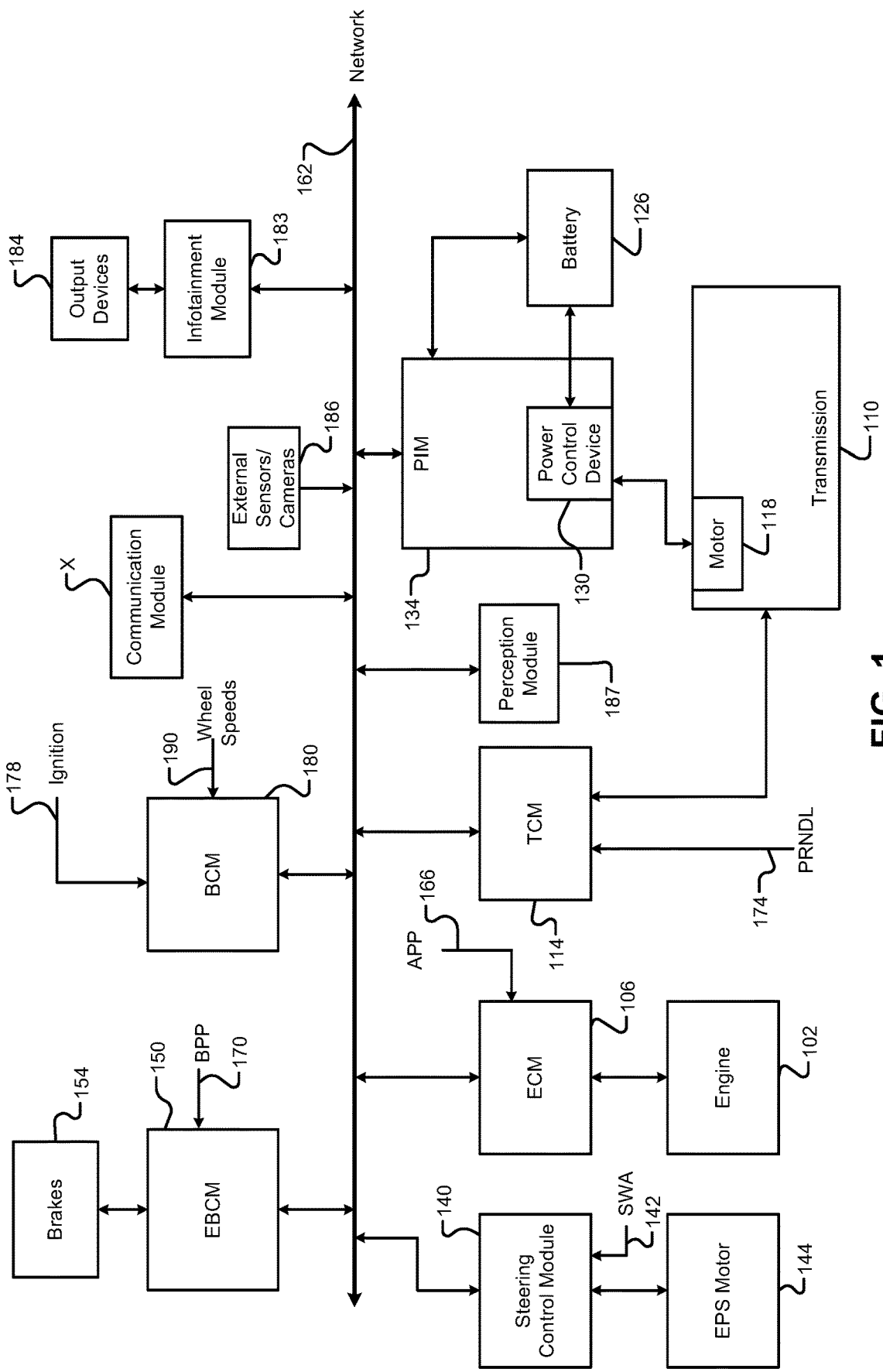
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators based on one or more driver inputs. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor. Also, one or more electric motors may be implemented without the transmission 110.

A power inverter module (PIM) 134 may control the electric motor 118 and the PCD 130, such as based on one or more driver inputs. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system. An electronic brake control module (EBCM) 150 may selectively control (e.g., friction) brakes 154 of the vehicle based on one or more driver inputs, such as a brake pedal position (BPP) 170.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. Propulsion torque generation (e.g., by the engine 102 and/or the electric motor 118) may be controlled based on the driver input. The BPP 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

Wheel speeds 190 measured by wheel speed sensors, respectively, may be input to the BCM 180 in various implementations. Each wheel speed sensor measures a rotational speed of one of the wheels. A vehicle speed module (e.g., in the TCM 114), may determine a speed of the vehicle (vehicle speed) based on one or more of the wheel speeds 190. For example only, the vehicle speed module may set the vehicle speed based on or equal to an average of all of the wheel speeds 190 or an average of the wheel speeds 190 of driven wheels of the vehicle. Driven wheels may be wheels that can transfer torque between the ground and one or more torque producing devices (e.g., the engine 102 and/or the electric motor 118).

An infotainment module 183 may output various information via one or more output devices 184. The output devices 184 may include, for example, one or more displays, one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

As another example, based on input from the external sensors and cameras 186, a perception module 187 perceives objects around the vehicle and locations of the objects relative to the vehicle. The ECM 106 may adjust torque output of the engine 102 based on input from the perception module 187. Additionally or alternatively, the PIM 134 may control power flow to and/or from the electric motor 118 based on input from the perception module 187. Additionally or alternatively, the EBCM 150 may adjust braking based on input from the perception module 187. Additionally or alternatively, the steering control module 140 may adjust steering based on input from the perception module 187. For example, one or more actions may be taken to avoid a perceived object.

A communication module 190 wirelessly communicates using one or more wireless communications protocols. The vehicle may include one or more additional control modules that are not shown, such as a chassis control module, a battery pack control module, etc. The vehicle may omit one or more of the control modules shown and discussed.

Figure 2:
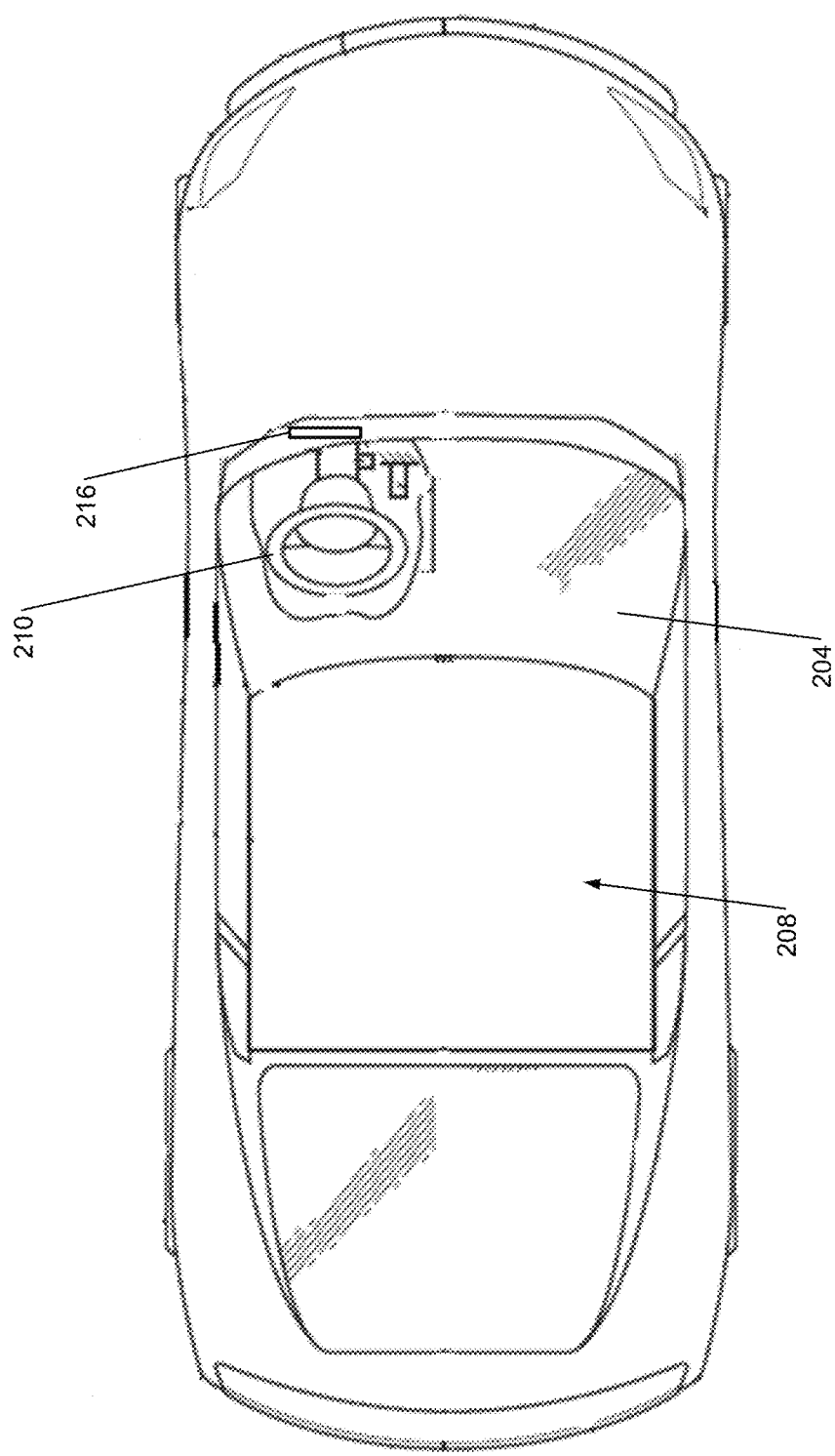
FIG. 2 is an overhead view of an example vehicle.
Figure 3:
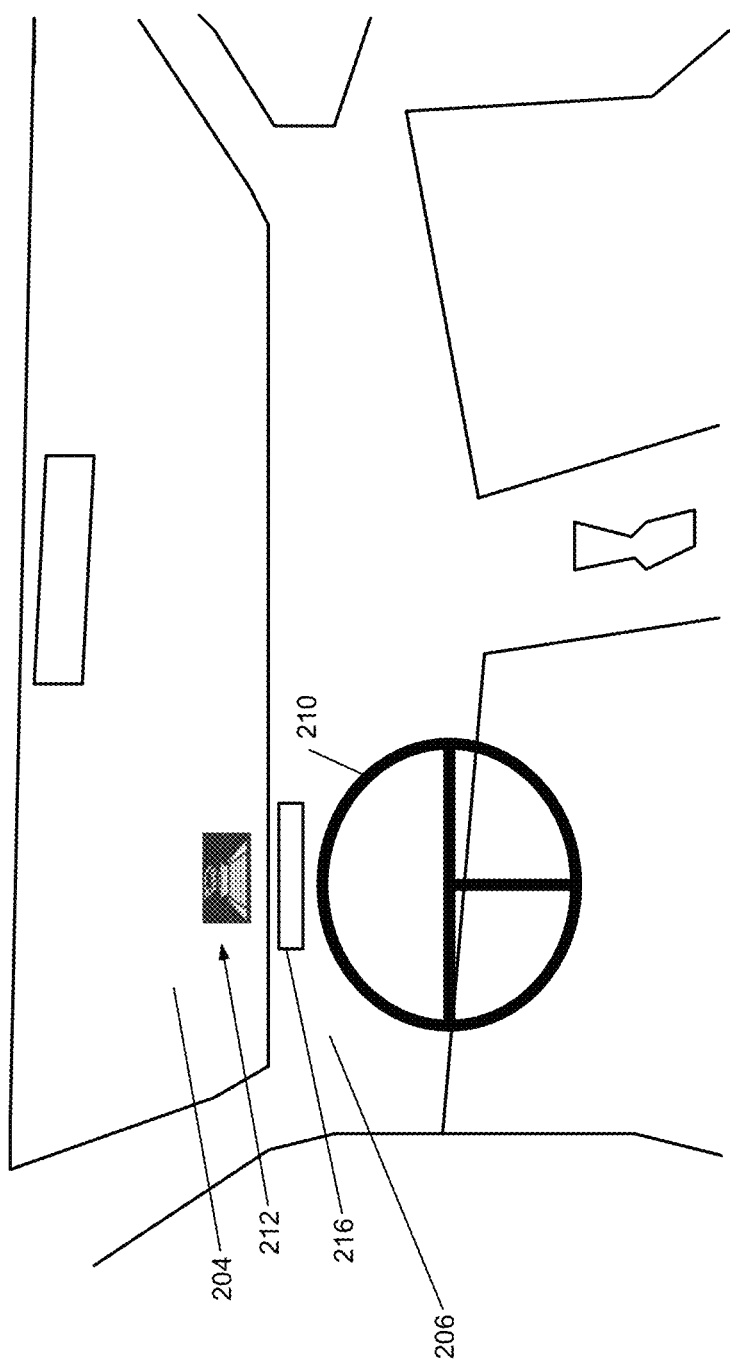
FIG. 3 is an example perspective view from of a driver seat within a passenger cabin of a vehicle.

FIG. 2 is an overhead (top) view of an example vehicle. FIG. 3 includes an example perspective view from a driver seat of a vehicle. The vehicle includes a windshield 204 located in a front opening of the vehicle. Passengers within a passenger cabin 208 of the vehicle can look through the windshield 204 to see in front of the vehicle.

As shown in FIG. 3, the windshield 204 is located vertically above a dashboard 206 of the vehicle. The driver may turn a steering wheel 210 within the passenger cabin 208 to turn and steer the vehicle, such as to change lanes, merge, and park the vehicle. The vehicle may be an autonomous vehicle, a semi-autonomous vehicle, or a non-autonomous vehicle. In various implementations, the steering wheel 210 may be stowable or omitted.

A head up display (HUD) system 400 (see FIG. 4) projects information 212 (e.g., a virtual image) onto a portion of the windshield 204 through one or more apertures, such as aperture 216, in the dashboard 206. While an example size of the information 212 is provided, the information 212 may be presented on a larger or smaller area. Examples of the information 212 includes various vehicle information, such as a present vehicle speed, a present gear of a transmission of the vehicle, an engine speed, a directional heading of the vehicle, present infotainment system settings, and/or other vehicle information. The HUD system 400 presents information to the driver of the vehicle without the driver having to look away from objects in front of the vehicle. Another example of the information 212 includes a visual indication of where the vehicle will be on a road when a traffic signal will change states, as discussed further below.

Figure 4:
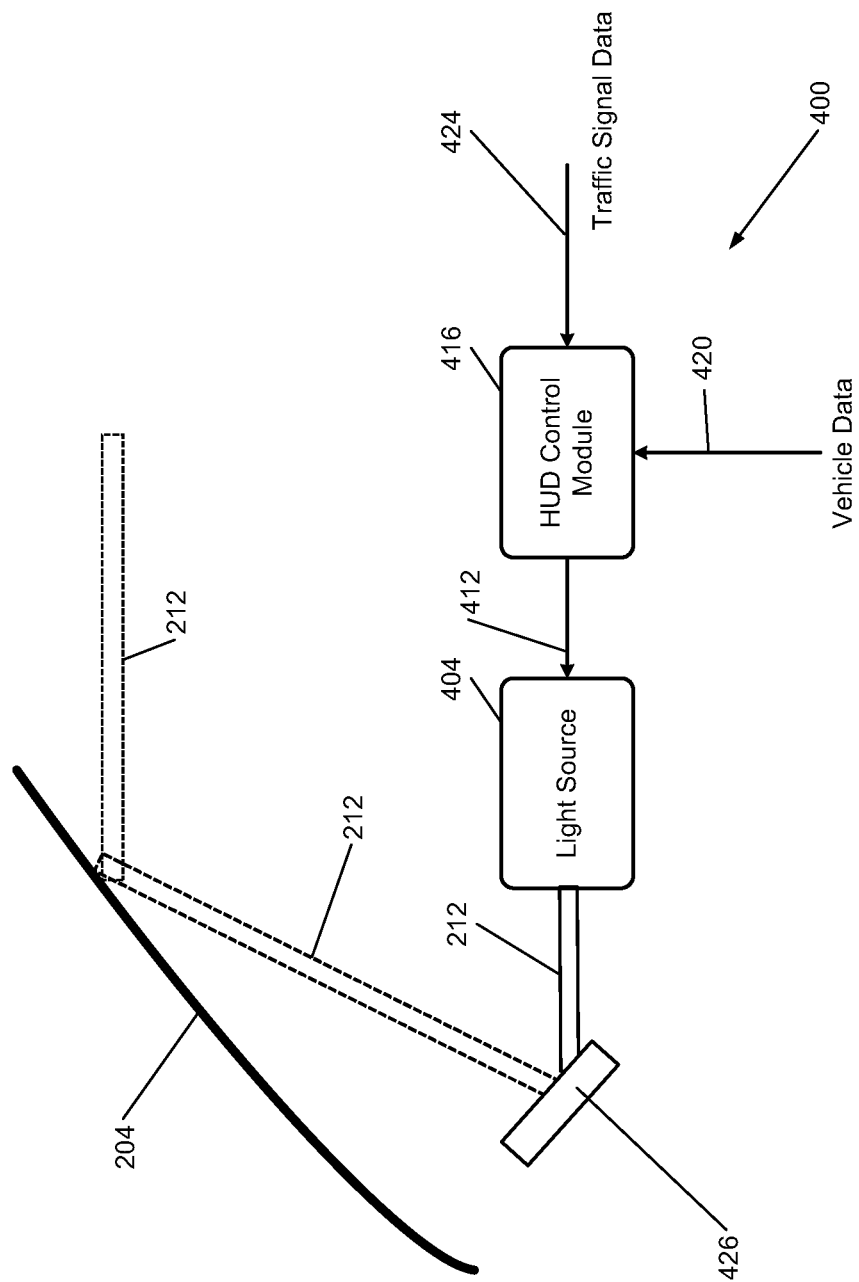
FIG. 4 includes a functional block diagram of an example implementation of a head up display (HUD) system.

FIG. 4 includes an example implementation of the HUD system 400. A light source 404 outputs (projects) light (e.g., of a virtual image) for display on the windshield 204 based on signals 412 from a HUD control module 416. For example only, the light source 404 may include one or more lasers and output red, green, and blue light. While the example of one light source is provided, the HUD system 400 may include multiple light sources, for example, to project light on two or more different vertical planes. The HUD control module 416 generates the signals 412 based on vehicle data 420 and traffic signal data 424, such as described below.

The HUD control module 416 may obtain the vehicle data 420 and the traffic signal data 424, for example, from the network 162. The vehicle data 420 may include, for example, the present speed of the vehicle, a target speed of the vehicle, the present gear of the transmission of the vehicle, the present engine speed, the present directional heading of the vehicle, the present infotainment system settings, and/or the other vehicle information. The traffic signal data 424 may include, for example, one or more (time) periods until a change in state (e.g., color) of a traffic signal will occur and/or other traffic signal information.

A reflector 426 may reflect the output of the light source 404 onto the windshield 204 through the aperture 216. A viewer (e.g., the driver) can view the information 212 in the area where the information 212 is projected onto the windshield 204. In various implementations, the reflector 426 may be omitted, and the light source 404 may project the information 212 directly onto the windshield 204.

FIG. 5 is a functional block diagram of an example traffic light control and communication system. A signal control module 504 controls a state of a traffic signal 508 at an intersection. The traffic signal 508 regulates traffic flow in one or more directions through the intersection. An illustration of an example of the traffic signal 508 is also provided in FIG. 5.

The traffic signal 508 may include a red indicator (e.g., light) 512, a yellow indicator (e.g., light) 516, and a green indicator (e.g., light) 520. The signal control module 504 selectively transitions from illuminating the green indicator 520 to illuminating the yellow indicator 516. The signal control module 504 selectively transitions from illuminating the yellow indicator 516 to illuminating the red indicator 512. The signal control module 504 selectively transitions from illuminating the red indicator 512 to illuminating the green indicator 520. While an example implementation of the traffic signal 508 is provided, the present application is also applicable to traffic signals of other configurations including more, less, and different indicators.

A communication module 524 is in communication with the signal control module 504. The communication module 524 receives (time) periods until the signal control module 504 will transition a state of the traffic signal 508 from one indicator to another indicator. For example, the communication module 524 may receive a first period (e.g., relative to a present time) until the signal control module 504 next transitions from illuminating the green indicator 520 to illuminating the yellow indicator 516, a second period (e.g., relative to the present time) until the signal control module 504 next transitions from illuminating the yellow indicator 516 to illuminating the red indicator 512, and a third period (e.g., relative to the present time) until the signal control module 504 next transitions from illuminating the red indicator 512 to illuminating the green indicator 520.

The communication module 524 communicates the first, second, and third periods to vehicles, such as the vehicle described above. The communication module 524 may communicate the first, second, and third periods via a network, such as the Internet. Additionally or alternatively, the communication module 524 may communicate the first, second, and third periods to the vehicle wirelessly, such as via vehicle to infrastructure (V2I) communication, dedicated short range communication (DSRC) communication, radio frequency (RF) communication, WiFi (IEEE 802.11 based) communication, Bluetooth communication (IEEE 802.15 based) communication, or another suitable type of wireless communication. The communication module 524 may wirelessly communicate with the vehicle via one or more antennas, such as antenna 528. In various implementations, the communication module 524 may only transmit ones of the first, second, and third periods that are less than a predetermined period (e.g., 20 seconds or 30 seconds).

The vehicle includes the communication module 190 that receives the first, second, and third periods, such as wirelessly or via the network. The communication module 190 may wirelessly receive data via one or more antennas, such as antenna 532. The communication module 190 provides the received ones of the first, second, and third periods to HUD control module 416. The HUD control module 416 visually indicates locations on the road where the vehicle will be on the road when transitions in the traffic signal 508 will occur.

Figure 6:
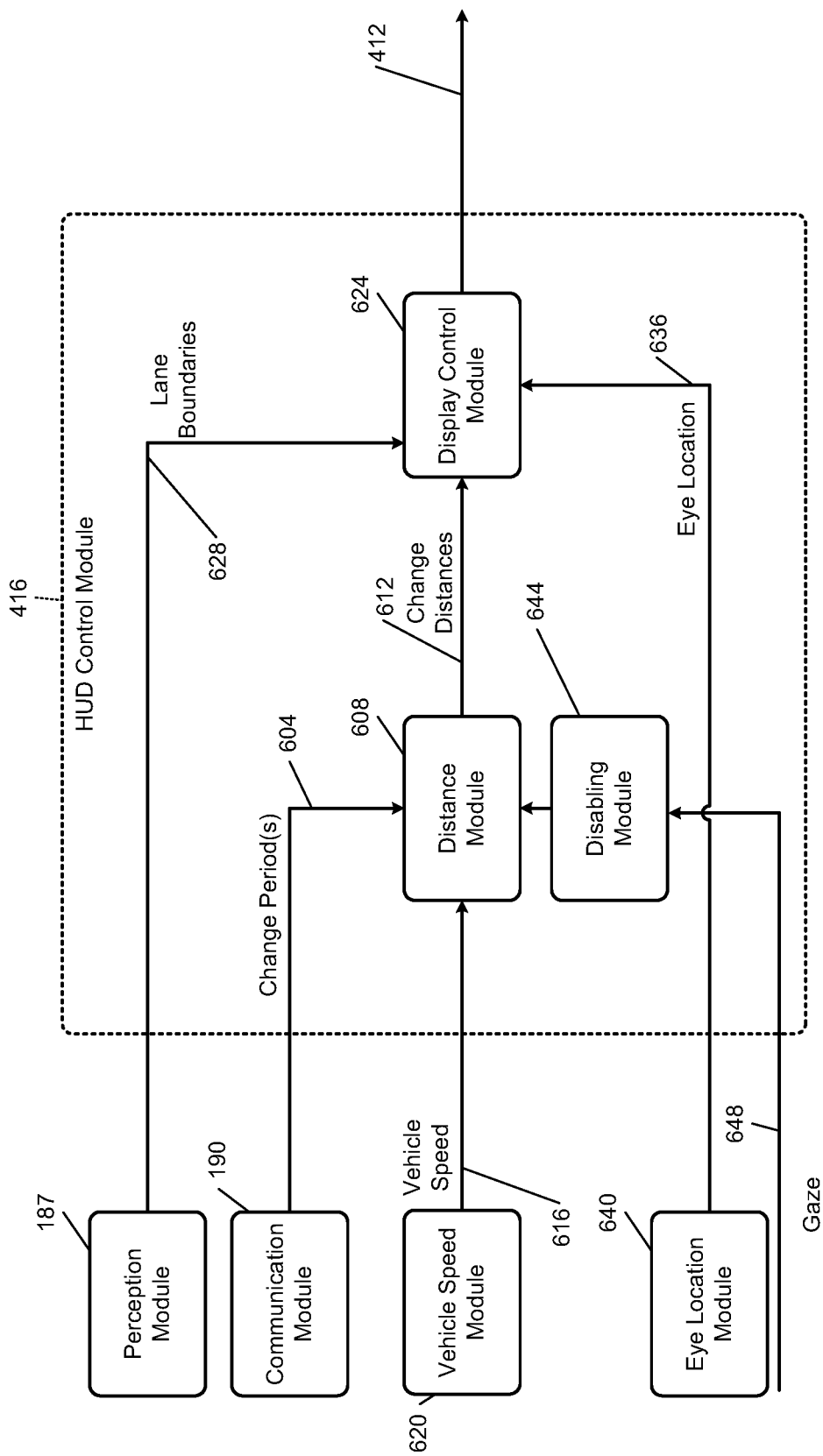
FIG. 6 is a functional block diagram of an example HUD control system.

FIG. 6 is a functional block diagram of an example HUD control system. As described above, the communication module 190 provides the received ones of the first, second, and third periods. The first, second, and third periods may collectively be referred to as change periods 604.

A distance module 608 determines one or more change distances 612 based on the change periods 604, respectively, and a (present) vehicle speed 616. The vehicle speed 616 may be determined based on one or more of the wheel speeds 190, such as described above. For example, a vehicle speed module 620 may set the vehicle speed 616 based on or equal to an average of two or more of the wheel speeds 190, such as the wheel speeds 190 of driven wheels of the vehicle. The distance module 608 may set each change distance using one of an equation and a lookup table that relates change periods and vehicle speeds to change distances.

For example, the distance module 608 may set a change distance based on or equal to the vehicle speed 616 multiplied by the respective change period. As examples, the distance module 608 may set a first change distance based on or equal to the vehicle speed 616 multiplied by the first period, a second change distance based on or equal to the vehicle speed 616 multiplied by the second period, and a third change distance based on or equal to the vehicle speed 616 multiplied by the third period. The first change distance corresponds to a distance (e.g., in front of the vehicle) where the signal control module 504 will next transition from illuminating the green indicator 520 to illuminating the yellow indicator 516. The second change distance corresponds to a distance (e.g., in front of the vehicle) where the signal control module 504 will next transition from illuminating the yellow indicator 516 to illuminating the red indicator 512. The third change distance corresponds to a distance (e.g., in front of the vehicle) where the signal control module 504 will next transition from illuminating the red indicator 512 to illuminating the green indicator 520. Each of the change distances 612 therefore indicates a distance (e.g., in front of the vehicle relative to a current location of the vehicle) where the vehicle will be on the present road when a change in the state of the traffic signal 508 will occur.

A display control module 624 controls the light source 404 (or light sources) to control the information 212 displayed. More particularly, the display control module 624 controls the light source 404 to display one or more visual indicators via the HUD system 400 that visually indicate the change distances 612, respectively, on the road in front of the vehicle. The display control module 624 may display the visual indicators between, on, or bounding boundaries 628 of a present lane within which the vehicle is located. The perception module 187 may identify the boundaries 628 using images from one or more cameras of the external sensors and cameras 186, such as one or more forward facing cameras.

Figure 7:
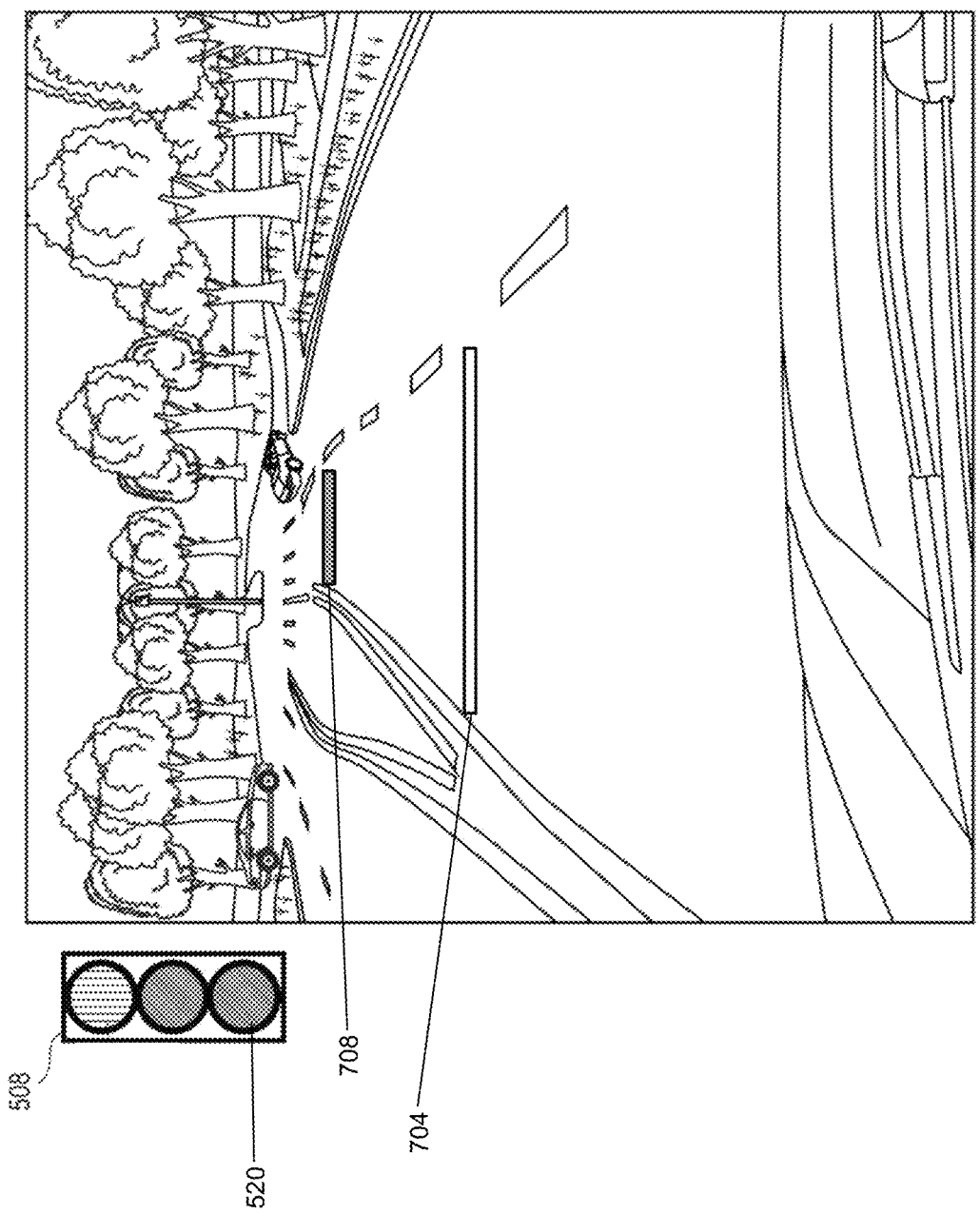
FIGS. 7-12 include illustrations of example visual indicators generated using the HUD system.

FIG. 7 includes an example illustration of an example where the green indicator 520 of the traffic signal 508 is presently illuminated as the vehicle approaches the intersection of the traffic signal 508. In this example, the display control module 624 displays a first visual indicator 704 at the first change distance in front of the vehicle where the signal control module 504 will next transition from illuminating the green indicator 520 to illuminating the yellow indicator 516. The display control module 624 may display the first visual indicator 704 in yellow to indicate the location where the vehicle will be when the transition to illuminating the yellow indicator 516 occurs.

The display control module 624 may also display a second visual indicator 708 at the second change distance in front of the vehicle where the signal control module 504 will next transition from illuminating the yellow indicator 516 to illuminating the red indicator 512. The display control module 624 may display the second visual indicator 708 in red to indicate the location where the vehicle will be when the transition to illuminating the red indicator 512 occurs.

While not shown in the example of FIG. 7, the display control module 624 may also concurrently display a third visual indicator at the third change distance in front of the vehicle where the signal control module 504 will next transition from illuminating the red indicator 512 to illuminating the green indicator 520. The display control module 624 may display the third visual indicator in green to indicate the location where the vehicle will be when the transition to illuminating the green indicator 520 occurs.

Figure 8:
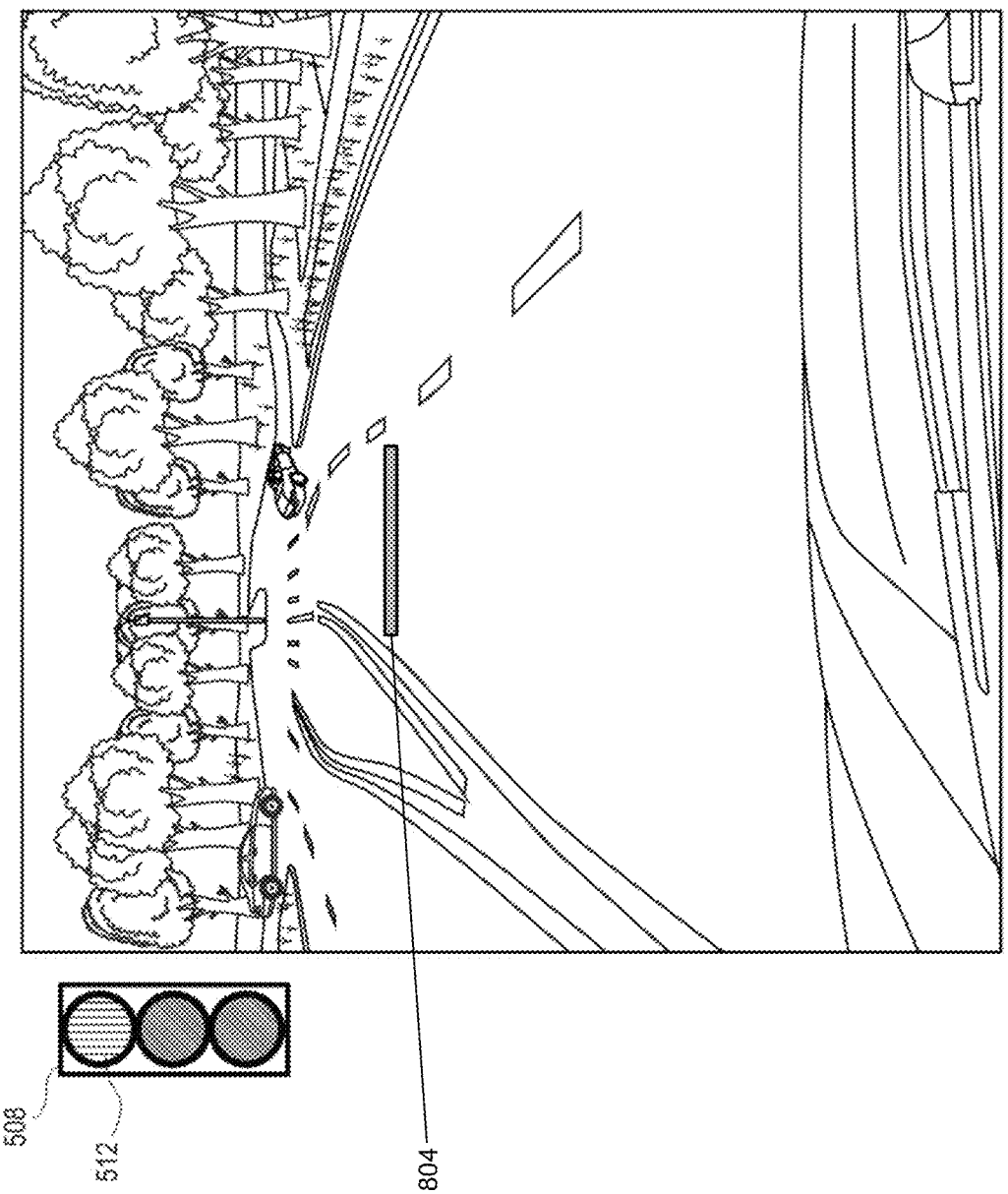
Figure 9:
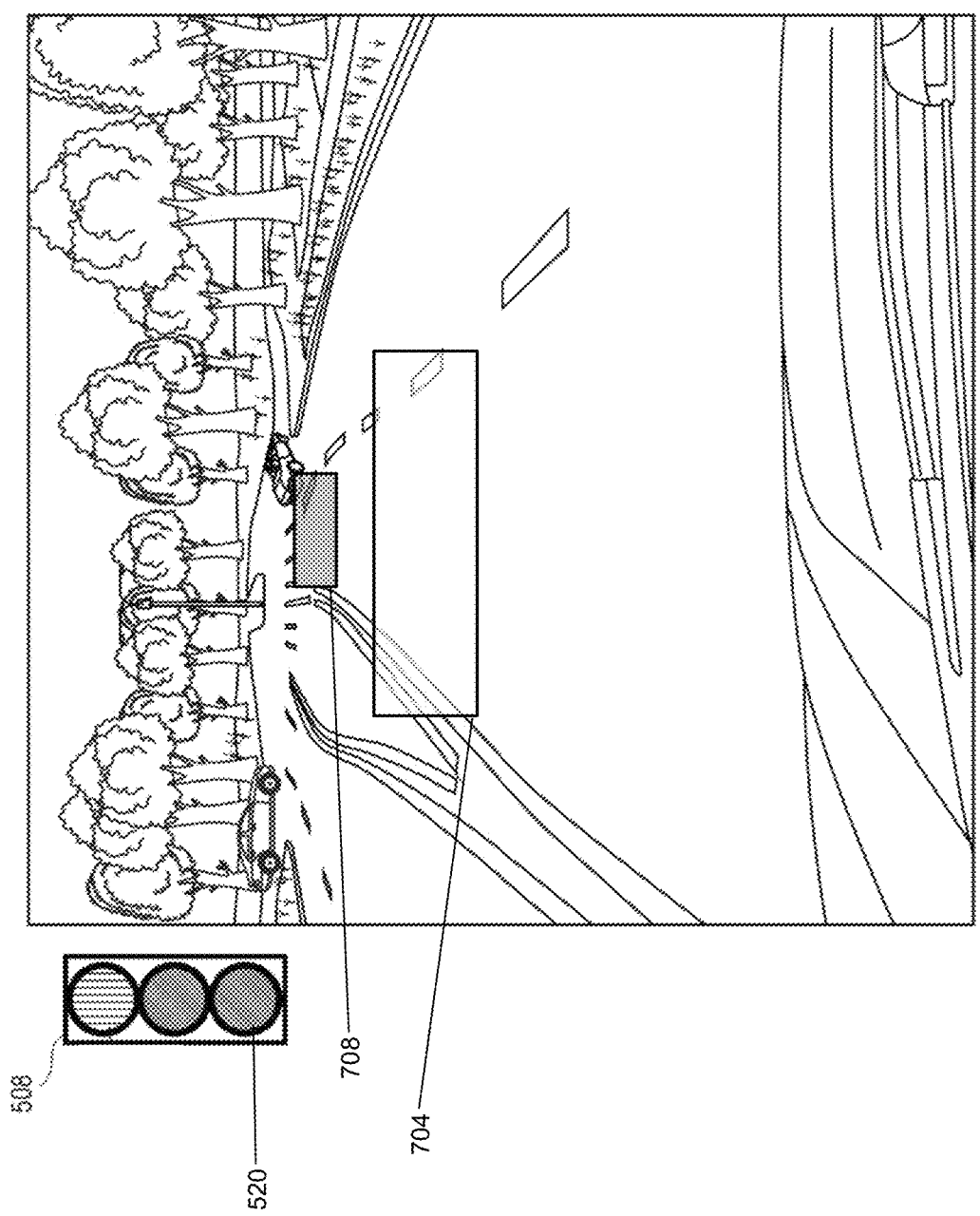

FIG. 8 includes an example illustration of an example where the red indicator 512 of the traffic signal 508 is presently illuminated as the vehicle approaches the intersection of the traffic signal 508. In this example, the display control module 624 displays a third visual indicator 804 at the third change distance in front of the vehicle where the signal control module 504 will next transition from illuminating the red indicator 512 to illuminating the green indicator 520. The display control module 624 may display the third visual indicator 804 in green to indicate the location where the vehicle will be when the transition to illuminating the green indicator 520 occurs. While not shown in the example of FIG. 8, the display control module 624 may also display the first and second indicators concurrently.

Figure 10:
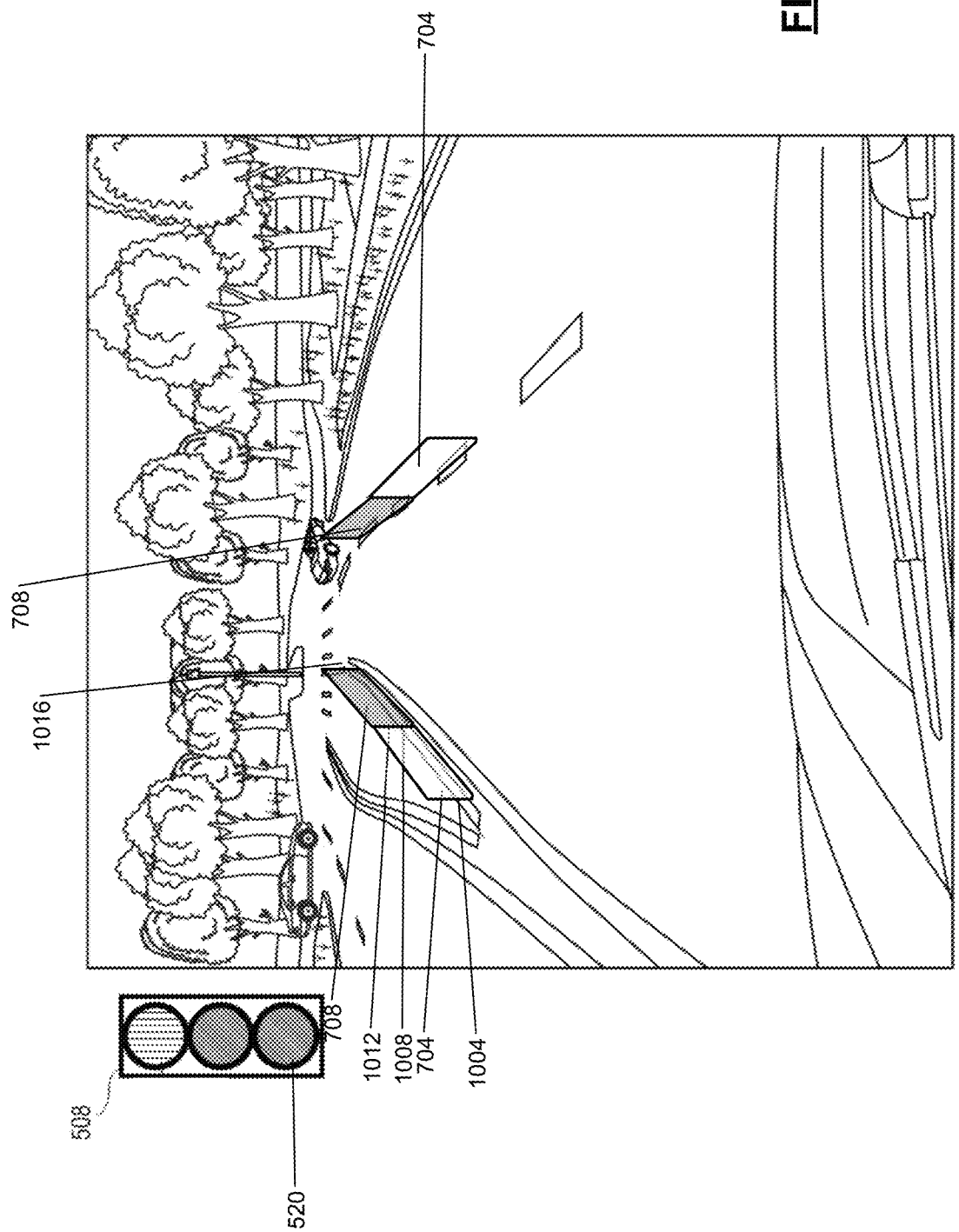

As illustrated in FIGS. 7 and 8, the display control module 624 may display the first, second, and third visual indicators as horizontal bars. However, the display control module 624 may display the first, second, and third visual indicators in another suitable manner. For example, the display control module 624 may display the first, second and third visual indicators as planes that extend both horizontally and vertically at the first, second, and third change distances, respectively. FIG. 10 illustrates the example of FIG. 7 with the first and second visual indicators 704 and 708 displayed as planes that extend both horizontally and vertically.

Figure 11:
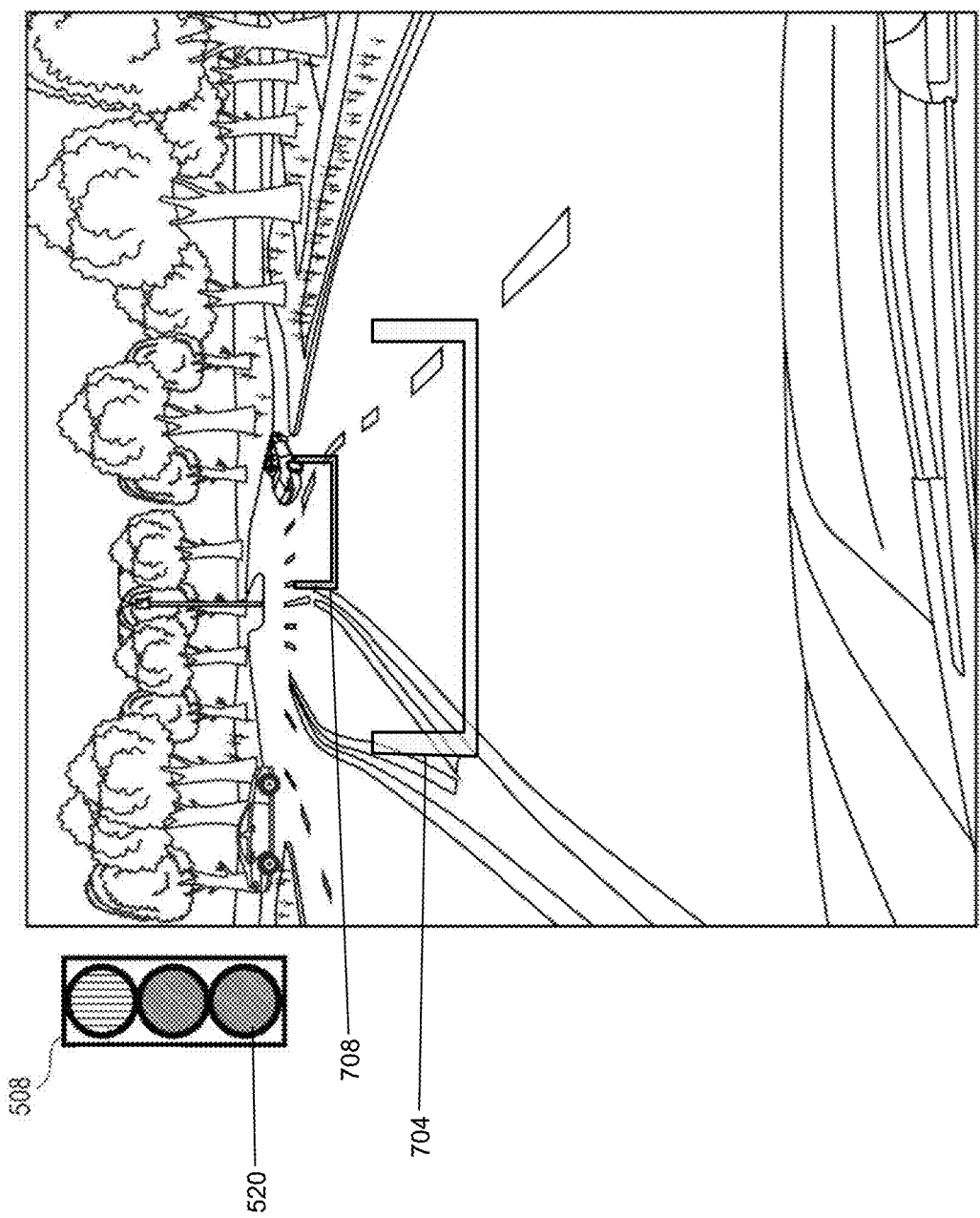

As another example, the display control module 624 may display the first, second and third visual indicators as walls that extend vertically on or beside the boundaries of the present lane of the vehicle. The walls may be provided on both sides of the present lane and may extend depth wise to where a next transition in the indicator of the traffic signal 508 will occur. For example, FIG. 11 illustrates the example of FIG. 7 with the first and second visual indicators 704 and 708 displayed as walls.

In this example, a closest (depthwise) vertical edge 1004 of the wall of the first visual indicator 704 may be located at the first change distance. A furthest (depthwise) vertical edge 1008 of the wall of the first visual indicator 704 may be located at the second change distance. In this way, the wall of the first visual indicator 704 extends from the first change distance to the second change distance in front of the vehicle.

A closest (depthwise) vertical edge 1012 of the wall of the second visual indicator 708 may be located at the second change distance and abut furthest vertical edge of the wall of the first visual indicator 704. A furthest (depthwise) vertical edge 1016 of the wall of the second visual indicator 708 may be located at the intersection or the third change distance, whichever is closer. In this way, the wall of the second visual indicator 708 extends from the second change distance to the third change distance or the intersection in front of the vehicle.

As another example, the display control module 624 may display the first, second and third visual indicators as gates that extend horizontally between the boundaries of the present lane and vertically on or beside the boundaries of the present lane of the vehicle. The gates may be provided on both sides of the present lane. For example, FIG. 10 illustrates the example of FIG. 7 with the first and second visual indicators 704 and 708 displayed as walls.

Figure 12:
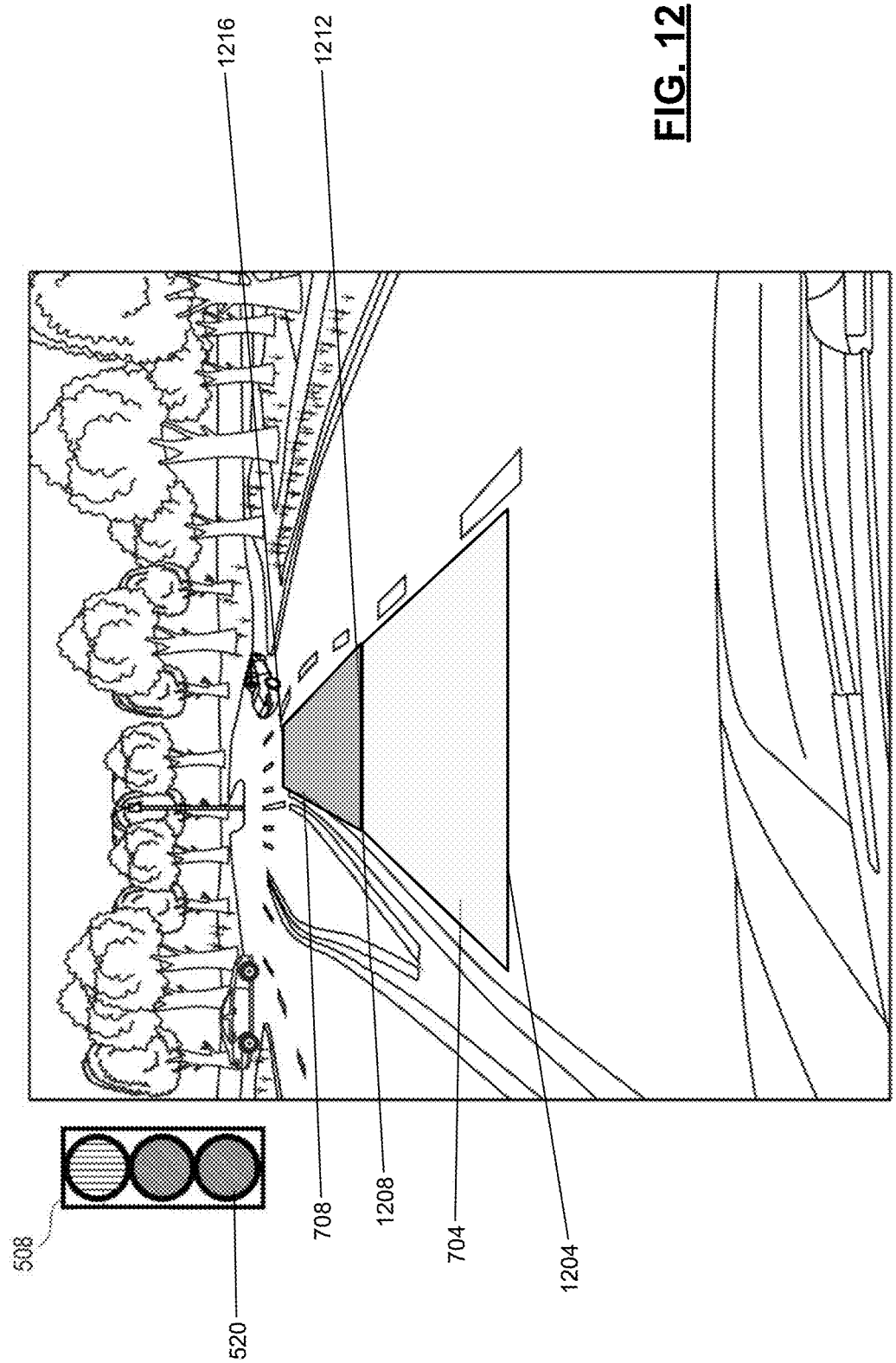

As another example, the display control module 624 may display the first, second and third visual indicators as carpets on the road that extend horizontally toward the boundaries of the present lane and depthwise toward the intersection within the boundaries of the present lane of the vehicle. The carpets may extend depth wise to where a next transition in the indicator of the traffic signal 508 will occur. For example, FIG. 12 illustrates the example of FIG. 7 with the first and second visual indicators 704 and 708 displayed as carpets on the road.

In this example, a closest (depthwise) horizontal edge 1204 of the carpet of the first visual indicator 704 may be located at the first change distance. A furthest (depthwise) horizontal edge 1208 of the carpet of the first visual indicator 704 may be located at the second change distance. In this way, the carpet of the first visual indicator 704 extends depthwise from the first change distance to the second change distance in front of the vehicle.

A closest (depthwise) horizontal edge 1212 of the wall of the second visual indicator 708 may be located at the second change distance and abut furthest horizontal edge of the carpet of the first visual indicator 704. A furthest (depthwise) horizontal edge 1216 of the carpet of the second visual indicator 708 may be located at the intersection or the third change distance, whichever is closer. In this way, the carpet of the second visual indicator 708 extends from the second change distance to the third change distance or the intersection in front of the vehicle.

Referring back to FIG. 6, in various implementations, the display control module 624 may adjust a location of the first, second, and/or third visual indicators based on a present location (e.g., view) 636 of eyes of the driver. For example, the display control module 624 may move the visual indicators vertically upward when the eye location 636 of the driver moves vertically upward and vice versa. Additionally or alternatively, the display control module 624 may display the visual indicators horizontally leftward when the eye location 636 of the driver moves horizontally leftward and vice versa.

An eye location module 640 may track eye position (e.g., pupil) of the driver and determine the eye location 636 based on the position of the eyes of the driver. The eye location module 640 may track the location of the eyes of the driver, for example, using a camera facing the driver seat and configured to capture images including eyes of the driver.

In various implementations, a disabling module 644 may selectively enable and disable the display of the visual indicators based on a gaze 648 of the driver. For example, the disabling module 644 may disable the display of the visual indicators when the gaze 648 is away from the road for at least a predetermined period (e.g., during autonomous or semiautonomous driving). This may prevent the visual indicators from being a distraction to the driver. The disabling module 644 may enable the display of the visual indicators when the gaze 648 is toward the road in front of the vehicle. For example, the disabling module 644 may disable the distance module 608 to disable the display of the visual indicators. Alternatively, the disabling module 644 may disable the display control module 624. A gaze module (e.g., of the eye location module 640) may determine the gaze 648 based, for example, using a camera facing the driver seat and configured to capture images including a face of the driver.

Figure 13:
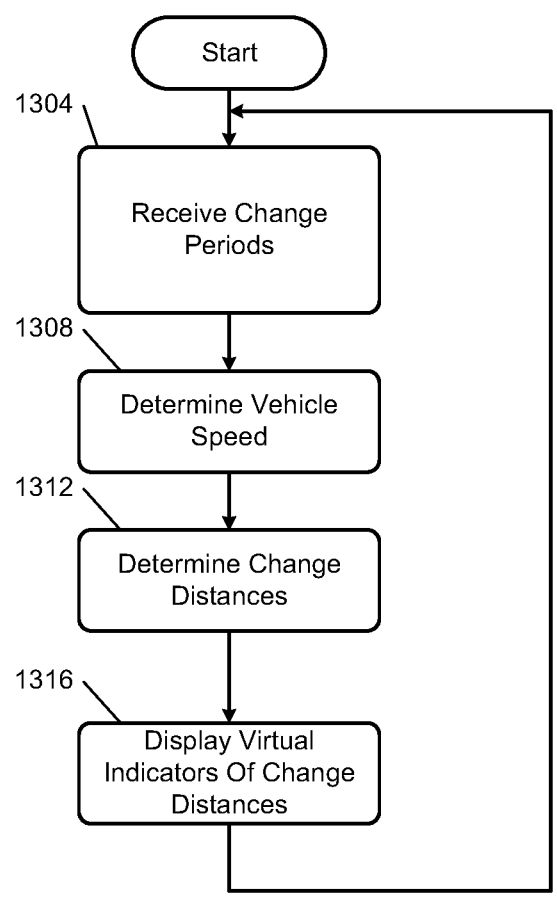
FIG. 13 is a flowchart depicting an example method of visually displaying via the HUD system where the vehicle will be when one or more changes in the state of a traffic signal will occur.

FIG. 13 is a flowchart depicting an example method of visually displaying via the HUD system 400 where the vehicle will be when one or more changes in the state of the traffic signal 508 will occur.

Control begins with 1304 where the communication module 190 of the vehicle receives the one or more change periods 604 for the traffic signal 508. Each of the change periods 604 corresponds to a period until the signal control module 504 will transition the traffic signal 508 from one state to a next state. At 1308, the vehicle speed module 620 determines the (present) vehicle speed 616.

At 1312, the distance module 608 determines the one or more change distances 612 based on the one or more change periods 604, respectively, and the vehicle speed 616. For example, the distance module 608 may set a change distance based on or equal to the respective change period multiplied by the vehicle speed 616. Each of the change distances 612 corresponds to a distance in front of the vehicle where the vehicle will be when the signal control module 504 will transition the traffic signal 508 from one state to a next state.

At 1316, the display control module 624 displays one or more visual indicators of the one or more change distances 612, respectively, via the HUD system 400. The visual indicators may be, for example, horizontal bars, planes that extend horizontally and vertically, walls that extend vertically and depthwise, gates that extend horizontally and vertically, or carpets that extend horizontally and depthwise, as discussed above. While these examples of visual indicators are provided, the present application is also applicable to other types of visual indicators. Control then returns to 1304 such that the visual indicators are updated as the vehicle moves and as the vehicle speed 616 changes.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A head up display (HUD) system of a vehicle, comprising:
   a communication module configured to receive a period until a traffic signal of an intersection of roads will change from a first state to a second state;
   a distance module configured to, based on the period and a present speed of the vehicle, determine a distance in front of the vehicle where the vehicle will be when the traffic signal transitions from the first state to the second state;
   a light source configured to, via a windshield of the vehicle, generate a virtual display that is visible within a passenger cabin of the vehicle; and
   a display control module configured to, based on the distance, control a light source to include, in the virtual display, a visual indicator of a location in a path of the vehicle where the vehicle will be when the traffic signal transitions from the first state to the second state.

2. The HUD system of claim 1 wherein the display control module is configured to control the light source such that the visual indicator includes a color corresponding to the second state.

3. The HUD system of claim 2 wherein the color is one of red, yellow, and green.

4. The HUD system of claim 1 wherein:
   the communication module is further configured to receive a second period until the traffic signal of the intersection of roads will change from the second state to a third state;
   the distance module is further configured to, based on the second period and the present speed of the vehicle, determine a second distance in front of the vehicle where the vehicle will be traffic signal transitions from the second state to the third state; and
   the display control module is further configured to, based on the second distance, control the light source to include, in the virtual display, a second visual indicator of a second location in the path of the vehicle where the vehicle will be when the traffic signal transitions from the second state to the third state.

5. The HUD system of claim 4 wherein the display control module is configured to control the light source such that the visual indicator includes a first color corresponding to the second state and the second visual indicator includes a second color corresponding to the third state.

6. The HUD system of claim 1 wherein the visual indicator extends horizontally at the location toward boundaries of a present lane of the vehicle.

7. The HUD system of claim 1 wherein the visual indicator extends horizontally and vertically at the location.

8. The HUD system of claim 1 wherein the visual indicator extends depthwise toward the intersection.

9. The HUD system of claim 1 wherein the visual indicator extends vertically and depthwise.

10. The HUD system of claim 1 wherein the communication module is configured to receive the period wirelessly from a signal control module configured to control the traffic signal.

11. The HUD system of claim 1 wherein the communication module is configured to receive the period, via the Internet, from a signal control module configured to control the traffic signal.

12. The HUD system of claim 1 further comprising:
   a disabling module configured to selectively disable the display of the visual indicator when a gaze of a driver is not toward a road in front of the vehicle.

13. The HUD system of claim 1 further comprising:
   an eye location module configured to determine a location of eyes of a driver of the vehicle,
   wherein the display control module is configured to adjust a location of the visual indicator in the virtual display based on the location of the eyes of the driver.

14. The HUD system of claim 1 wherein the first state includes the traffic signal illuminating a green indicator and the second state includes the traffic signal illuminating a yellow indicator.

15. The HUD system of claim 1 wherein the first state includes the traffic signal illuminating a yellow indicator and the second state includes the traffic signal illuminating a red indicator.

16. The HUD system of claim 1 wherein the first state includes the traffic signal illuminating a red indicator and the second state includes the traffic signal illuminating a green indicator.

17. A head up display (HUD) method for a vehicle, comprising:
   receiving a period until a traffic signal of an intersection of roads will change from a first state to a second state;
   based on the period and a present speed of the vehicle; determining a distance in front of the vehicle where the vehicle will be when the traffic signal transitions from the first state to the second state;
   via a windshield of the vehicle, generating a virtual display that is visible within a passenger cabin of the vehicle; and
   based on the distance, controlling a light source to include, in the virtual display, a visual indicator of a location in a path of the vehicle where the vehicle will be when the traffic signal transitions from the first state to the second state.

18. The HUD method of claim 17 wherein the controlling includes controlling the light source such that the visual indicator includes a color corresponding to the second state.

19. The HUD method of claim 18 wherein the color is one of red, yellow, and green.

20. The HUD method of claim 17 further comprising:
   receiving a second period until the traffic signal of the intersection of roads will change from the second state to a third state;

based on the second period and the present speed of the vehicle, determining a second distance in front of the vehicle where the vehicle will be traffic signal transitions from the second state to the third state; and based on the second distance, controlling the light source to include, in the virtual display, a second visual indicator of a second location in the path of the vehicle where the vehicle will be when the traffic signal transitions from the second state to the third state.

\* \* \* \* \*